(No Model.)
P. SOMERVILLE.
VEHICLE AXLE.
No. 412,050. Patented Oct. 1, 1889.
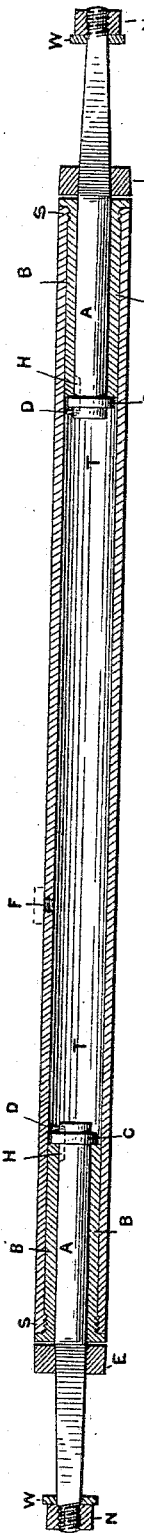
Witnesses
H. D. Nealy
T. W. Fowler
Inventor
Philip Somerville
by A. H. Evans & Co
Attorneys

UNITED STATES PATENT OFFICE.

PHILIP SOMERVILLE, OF SAN FRANCISCO, CALIFORNIA.

VEHICLE-AXLE.

SPECIFICATION forming part of Letters Patent No. 412,050, dated October 1, 1889.

Application filed April 5, 1889. Serial No. 306,119. (No model.)

*To all whom it may concern:*

Be it known that I, PHILIP SOMERVILLE, of the city and county of San Francisco, State of California, have invented an Improvement in Axles; and I hereby declare the following to be a full, clear, and exact description of the same.

My invention relates to that class of axles for vehicles in which independent wheel-carrying spindles are properly journaled in the ends of the axle; and my invention consists in the novel construction and arrangement of the parts hereinafter fully described, and specifically pointed out in the claims.

The object of my invention is to provide an axle of this class in which the connection of the wheel-carrying spindles and the axle is a simple and effective one, permitting their ready adjustment and oiling.

Referring to the accompanying drawing for a more complete explanation of my invention, the figure is a longitudinal section of my axle.

A are the independent spindles for carrying the wheels, unnecessary herein to show.

T is the axle-body, consisting of a tubular piece having each end internally threaded. Into each end of the axle-body is screwed a tubular bearing B. Upon the inner end of the spindles A is formed a shoulder or flange C, which abuts behind the end of the bearing B, and upon the projecting ends of the spindles are fitted the collars E, so that said spindles are held in place by the collars E and flanges C abutting against each end of the bearings B.

N is the nut on the end of the spindles, and the wheel-hub is to lie between this nut and the collar E. The projecting end of the spindles is made square or angular in cross-section, so that the wheel-hub is fastened thereby directly to the spindle, and the collar E is also fastened to it.

F is an oil-hole in the tubular axle-body, by which oil is supplied to it.

D is a small piece of metal or other material, which is fitted to the inner end of the spindle, and in said inner end is made an opening or groove H, which extends to the journal of the spindle.

In operation the axle-body T is stationary, and the tubular bearings B are also fixed. The spindles A rotate with the wheels in the bearings B, and are held in place by the flanges C and the collars E. The small piece D, rotating with the spindles, dips into the oil in the axle-body, and the oil drops off from it and passing into the groove or opening H lubricates the journals.

It will be seen that by this construction the wheels, with their spindles, may be readily connected with and disconnected from the axle-body.

Having thus described my invention, what I claim as new, and desire to secure by Letters Patent, is—

1. In an axle, the combination of the tubular body-piece, the fixed tubular bearings screwed into each end of said piece, the independent spindles for carrying the wheels and journaled in the bearings, the flanges on the inner end of the spindles abutting against the inner end of the tubular bearings, and the collars on said spindles abutting against the outer ends of said bearings, substantially as described.

2. In an axle, the combination of the tubular body-piece, the tubular bearings screwed into each end of said piece, the independent spindles journaled in the tubular bearings and having their projecting ends square or angular in cross-section to receive the wheels, the flanges on the inner ends of the spindles and abutting against the inner ends of the tubular bearings, the collars fast on said spindles abutting against the outer ends of said bearings, and the nuts for confining the wheel on the spindles between themselves and the collars, substantially as described.

3. In an axle, the combination of the tubular body-piece, the tubular bearings screwed into each end of said piece, the independent spindles journaled in the tubular bearings, the flanges on the inner ends of the spindles abutting against the inner ends of the bearings, the collars on said spindles abutting against the outer ends of the bearings, the oiling-pieces D, secured to the inner ends of the spindles, the oil-grooves H in said spindles, and the oil-hole F in the body-piece, substantially as described.

PHILIP SOMERVILLE.

Witnesses:
E. Y. BUCKLEY,
HENRY PERRY.